United States Patent

Gaudiana et al.

[11] Patent Number: 4,792,597
[45] Date of Patent: Dec. 20, 1988

[54] MELT-PROCESSABLE POLYESTERAMIDES HAVING PARA-LINKED, SUBSTITUTED-PHENYLENE RADICALS

[75] Inventors: Russell A. Gaudiana, Merrimack, N.H.; Howard G. Rogers, Weston; Roger F. Sinta, Woburn, both of Mass.

[73] Assignee: Polaroid Corporation, Cambridge, Mass.

[21] Appl. No.: 138,062

[22] Filed: Dec. 28, 1987

[51] Int. Cl.$^4$ .............................................. C08G 69/44
[52] U.S. Cl. ................................. 528/183; 528/179; 528/182; 528/191; 528/192; 528/193; 528/194
[58] Field of Search ............... 528/183, 191, 192, 193, 528/194, 179, 182

[56] References Cited

U.S. PATENT DOCUMENTS

| | | | |
|---|---|---|---|
| 4,330,457 | 5/1982 | East et al. | 524/602 |
| 4,351,918 | 9/1982 | Charbonneau et al. | 524/602 |
| 4,355,132 | 10/1982 | East et al. | 524/602 |
| 4,384,107 | 5/1983 | Rogers et al. | 528/183 |
| 4,433,132 | 2/1984 | Rogers et al. | 528/191 |
| 4,446,305 | 5/1984 | Rogers et al. | 528/348 |
| 4,575,547 | 3/1986 | Rogers et al. | 528/191 |
| 4,608,429 | 8/1986 | Rogers et al. | 528/194 |
| 4,709,004 | 11/1987 | Dai | 528/183 |
| 4,727,131 | 2/1988 | Kocr et al. | 528/183 |

OTHER PUBLICATIONS

Y. Imai, et al., Journal of Polymer Science; Polymer Chemistry Edition, vol. 19, pp. 3285–3291 (1981).
J. Preston, Journal of Polymer Science: Part A-1, vol. 8, pp. 3135–3144 (1970).
J. E. McIntyre, et al., The British Polymer Journal, Mar. 1981, pp. 5–10.

*Primary Examiner*—Harold D. Anderson
*Attorney, Agent, or Firm*—Louis G. Xiarhos

[57] ABSTRACT

Aromatic polyesteramides exhibiting melt processability are disclosed. The polyesteramides comprise certain essential repeating units of the formulas

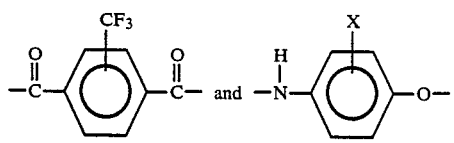

wherein X is alkyl, alkoxy, trifluoromethyl, halogen or nitro. The polyesteramides exhibit melt anisotropy. Films and fibers combining a balance of properties suited to high strength service can be provided from the melt-processable polyesteramides.

11 Claims, No Drawings

MELT-PROCESSABLE POLYESTERAMIDES HAVING PARA-LINKED, SUBSTITUTED-PHENYLENE RADICALS

BACKGROUND OF THE INVENTION

This invention relates to certain aromatic polyesteramides which exhibit desirable melt processability and hhich are useful in the production of films and fibers. More particularly, it relates to aromatic polyesteramides containing para-linked, substituted-phenylene radicals interconnected by ester and amide linkages. The polyesteramides exhibit melt anisotropy at temperatures of approximately 260° C. and lower, and preferably, below approximately 240° C.

The production of polyamides, polyesters and polyesteramides suitable for high strength service without the use of reinforcing agents has been well known. These polymers have been variously described as being "liquid crystalline", "thermotropic", "mesogenic", and "anisotropic". In general, these polymers are thought to be characterized by parallel ordering of their molecular chains and are prepared from monomers which are generally long, flat and fairly rigid along the long axis of the molecule. The monomers commonly have chain-extending linkages that are coaxial or parallel. Numerous patents and publications describing polyesters, polyamides and polyesteramides are cited, for example, in U.S. Pat. No. 4,351,918, issued Sept. 28, 1982 to L. F. Charbonneau, et al.

In general, it is well recognized that the mechanical and physical properties of polymeric films and fibers will depend upon the chemical structure of the monomers from which they are prepared and that such properties can be materially influenced by such molecular factors as chain stiffness, intermolecular forces, orientation and crystallinity. Accordingly, there has been considerable interest in the development of polyesters, polyamides and polyesteramides, having particular structural or molecular configurations for the realization of one or more particular properties suited to a desired application. Notably, there has been particular interest in the development of melt processable polymers capable of forming an anisotropic melt phase and suited to processing into films and fibers.

In the production of melt-processed films and fibers from aromatic polyesters and polyesteramides, melt processability is frequently hampered by the tendency of such materials to be melt processable only at elevated temperatures which, in someiinstances, may approach the onset of thermal degradation. In U.S. Pat. No. 4,575,547 (issued Mar. 11, 1986 to H. G. Rogers, et al.), and in U.S. Pat. No. 4,608,429 issued Aug. 6, 1986 to H. G. Rogers, et al.), aromatic polyesters suited to melt processing into films and fibers are described. The polyesters of these patents are especially advantageous from the standpoint of their processability at lower temperatures, e.g., in the range of about 115° C. to 205° C. The improved melt processability of these polyesters, relative to aromatic polyesters in general, which are only melt processable at higher temperatures, permits improved handling of the polymers and allows for the production of polymeric films and fibers. Frequently, however, it will be advantageous that a polymeric material exhibit a desirable balance of mechanical properties suitable for high strength service, while still being adapted to processing into films and fibers by resort to general molding and melt processing methods and without need for the use of solvent materials and the handling and recovery operations associated therewith. Moreover, it will be advantageous where a combination of high strength properties and practical melt processability can be realized in a polymer containing repeating units derived from a minimal number of reactants.

SUMMARY OF THE INVENTION

The present invention provides a class of melt-processable polyesteramides aapable of forming an anisotropic melt phase at a temperature of approximately 260° C. or lower. The polymers include certain essential substituted-phenylene radicals interconnected by ester and amide linkages. Films and fibers combining a balance of properties suited to high strength service can be provided from the melt-processable polyesteramide materials.

According to the present invention, there is provided a melt-processable polyesteramide capable of forming an anisotropic melt phase at a temperature of approximately 260° C. or lower, comprising as essential units, repeating units (I) and (II), wherein:

(I) is a repeating unit of the formula

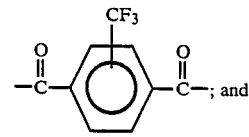
; and (II) is a repeating unit of the formula

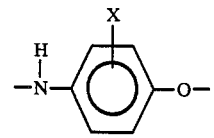

wherein X is alkyl, alkoxy, trifluoromethyl, halogen or nitro.

DETAILED DESCRIPTION OF THE INVENTION

The polyesteramides of the invention contain a combination of certain essential divalent aromatic radicals of the formulas (I) and (II). It will be seen from inspection of formulas (I) and (II) that the polyesteramides of the invention are aromatic polycondensation products which include repeating units derived from trifluoromethyl-substituted terephthalic acid (or the corresponding acid halide or alkyl ester) along with repeating units derived from a substituted aminophenol.

Each of the formula (I) and (II) repeating units contains a substituted arylene, i.e., a substituted phenylene radical. The chain-extending divalent bonds of the substituted phenylene radicals are in a para orientation which is believed to contribute importantly to the desirable strength and physical properties and to the essentially rigid and rod-like character of the polyesteraiide. The trifluoromethyl substituent of the formula (I) repeating unit and the X substituent of the formula (II) repeating unit contribute to melt processability and to solubility of the polyesteramide which permits polycondensation to high molecular weight polyesteramides.

It will be appreciated that the formula (I) and (II) repeating units are combined in the polyesteramide by a plurality of ester and amide linkages which are formed according to the requirements of stoichiometry. Thus, the equivalents of carboxylic groups in repeating unit (I) will equal the total number of equivalents of amino and oxy groups in repeating unit (II). Stoichiometric requirements can be met by introducing into a polycondensation reaction mixture, sufficient quantities of each of the monomeric compounds providing the repeating units of formulas (I) to (II), so that the carboxylic groups and the total of amino and oxy groups are substantially equivalent. As used herein, the term substantially equivalent refers to a number of equivalents of carboxylic groups and combined amino and oxy groups which is in the range of from 0.9 to 1.1 times the exact stoichiometric equivalent. Thus, an excess or a deficiency up to about 10% is considered substantially equivalent. Excess (unreacted) monomer reactant can be readily removed upon isolation of the desired polyesteramide.

The formula (I) repeating unit of the formula

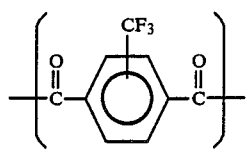
(I)

comprises an essential part of the polyesteramide and contributes to melt processability and to high strength and high birefringence observed in oriented films and fibers prepared therefrom. In addition, the presence of the trifluoromethyl substituent is believed to promote the solubility of the polycondensation polymer in the polymerization solvent which allows the desired polymerization to proceed toward production of high molecular polymers which, in turn, enhances the modulus and strength properties of the resulting polycondensation product.

The formula (I) repeating unit can be incorporated into the polyesteramide by introducing into the polycondensation reaction mixture, for example, the mnnomer 2-trifluoromethyl-1,4-phenylene dicarbonyl chloride. Such compound is known and can be prepared according to the procedure of Kan Inukai and Yasuo Maki, Kogyo Kagaku Zasshi, 68(2), 315 (1965). If desired, the corresponding acid or lower-alkyl ester can be employed in a polycondensation reaction conducted according to known polycondensation methods.

The repeating unit represented by formula (II) serves to introduce into the polyesteramide material repeating para-oriented phenylene nuclei that contribute to a polymeric rigid-rod character and ester and amide linkages which interconnect the various aromatic nuclei of the aromatic polyesteramide. In the formula (II) radical,

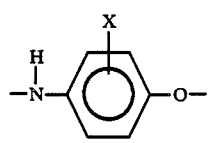
(II)

the X substituent can b alkyl, (e.g., methyl, ethyl, propyl, t-butyl); alkoxy (e.g., methoxy) trifluoromethyl; halogen (e.g., chloro, bromo); or nitro. The essential formula (II) repeating unit is incorporated into the polyesteramide by including into the polycondensation reaction mixture an aromatic compound containing the essential amino and hydroxyl reactive groups. Suitable reactants for this purpose include 2-methyl-4-aminophenol; 2-methoxy4-aminophenol; 2-trifluoromethyl-4-aminophenol; 2-chloro-4-aminophenyl and 2-bromo-4-aminophenol. Preferred reactants include 2-methyl-4-aminophenol and 2-trifluoromehyl-4-aminophenol.

The presence of the X substituent on the phenylene nucleus of the formula (II) repeating unit exhibits a material influence on the properties of the polyesteramide. For example, when an unsubstituted 4-aminophenol is used in the polycondensation reaction with 2-trifluoromethyl-1,4-phenylene dicarbonyl chloride, the resulting polymer shows decomposition at a temperature of 358° C. without having exhibited a desired melting phase. In contrast, the presence of a substituent group as defined allows for the production of polyesteramides which show melt anisotropy at approximately 260° C. or lower, and preferably, below approximately 240° C.

In preparing a polyesteramide of the invention, the formula (II) repeating unit can comprise a mixture of one or more repeating units having different X substituents. For example, a mixture of 2-methyl-4-aminophenol and 2-trifluoromethyl-4aminophenol can be employed.

While the polyesteramide of the invention has been described by reference to the repeating units of formulas (I) and (II), the polyesteramide can also include repeating units which do not conform thereto. Examples of repeating units which do not conform to such descrpptions and which can be present in the polyesteramides hereof, in proportions which do not undesirably elevate the melting temperature of the polyesteramide, include repeating units of the following formulas (III), (IV) and (V):

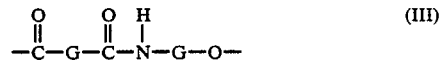
(III)

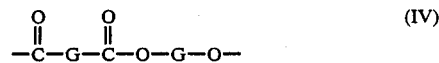
(IV)

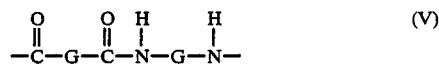
(V)

wherein, for example, at least one of the divalent G radicals in each of the formulas represents an aliphatic radical or an aromatic radical other than the aromatic radicals recited in the repeating units of formula (I) and (II). Thus, in any of the repeating units of formulas (III), (IV) or (V), each of the G radicals can be 1,2-ethylene; 1,2-propylene; 1,3-propylene; 1,4-phenylene; 1,3-phenylene; 4,4'-biphenylene; substituted 1,4-phenylene, 1,3-phenylene and 4,4'-biphenylene radicals; the stilbene radical of the formula;

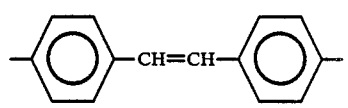

corresponding substituted-stilbene radicals; biphenylene radicals interbonded through methylene, ether, sulfone, sulfide or like group; trans-vinylene; ethynylene; 2,4'-trans-vinylenephenylene; and polyunsaturated divalent radicals such as trans,trans-1,4-butadienylene and 1,4-dimethyl-trans,trans-1,4-butadienylene.

It will be appreciated that the nature of the repeating units incorporated into the polyesteramides hereof (including the formula (I) and (II) repeating units, and any optional repeating units of formulas (III), (IV) and/or (V) that may be present) will effect the properties observed in the polyesteramide material. Where the polyesteramide material is desirably employed as a birefringent layer in an optical device, it will be preferred that the presence of formula (III), (IV) and (V) repeating nnits be avoided or minimized.

The formula (I) and (II) repeating units contain aromatic radicals having essentially coaxial chain-extending bonds that are suited to the provision of a rigid, rod-like character. For example, aromatic radicals having para-oriented chain-extending bonds will be preferred where a rigid rod-like polymer exhibiting highly birefringent behavior in oriented films or fibers is desired.

Radicals having a flexible character such as alkylene radicals and biphenylene radicals interbonded through methylene, ether, sulfone, sulfide or the like, and phenylene radicals having ortho- or meta- oriented bonds, should be avoided where a birefringent polymer is desired, but can be included in the polyesteramide for predetermined modification of the properties thereof. The inclusion of such radicals in the formula (III), (IV), and/or (V) repeating units can, for example, be employed for further reduction in the melting temperature of the polyester.

The polyesteramides of the present invention can be prepared by a solution polycondensation reaction. In general, the polyesteramides can be prepared by reaction of 2-trifluoromethyl 1,4-phenylene dicarboxylic acid (or the corresponding acid halide or alkyl ester) with a substituted aromatic aminophenol according to known polycondensation methods. For example, a polyesteramide containing repeating units of the type represented by formulas (I) and (II) can be suitably prepared by the reaction of: (I) an aromatic dicarboxylic acid halide of the formula

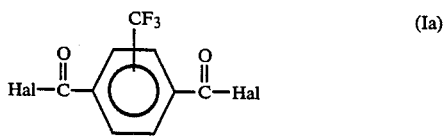

where Hal represents halogen, such as chloro or bromo; and (II) an aminophenol of the formula

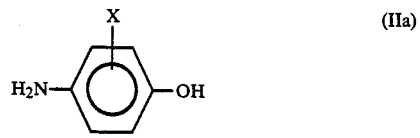

wherein X has the meaning aforedescribed in connection with the formula (II) repeating unit. Additional compounds from the classes of dicarboxylic acids (or corresponding acid halide or alkyl esters), aminoalcohols, aminophenols, diols and/or diamines can be included in the reaction mixture to provide any of the optional repeating units referred to hereinbefore by formulas (III), (IV) and (V). Each of the monomeric compounds used in the polycondensation reaction mixture to introduce the corresponding and predetermined repeating units will be employed in concentrations appropriate to stoichiometric requirements.

In the case, for example, of a solution polycondensation reaction, the polyesteramide can be obtained by reaction of the 2-trifluoromethyl-4,4'-phenylene dicarboxylic acid halide with the substituted aromatic aminophenol in a suitable inert organic solvent and in the presence of a catalyst (or acid acceptor) which neutralizes hydrogen chloride formed, e.g., pyridine.

An inert organic solvent is utilized to dissolve the polyesteramide produced by the polycondensation reaction. Suitable solvents include chloroform, methylene chloride, 1,2-dichloroethane, 1,1,2,2-tetrachloroethane, dimethylsulfoxide, N,N-dimethylformamide and acetone. In general, the polyesteramide is obtained by reaction of one mole of the aminophenol with 1.0 to 1.05 moles of the aromatic dicarboxyclic acid halide (or mixture thereof) in the organic solvent and in the presence of at least two moles of the acid acceptor. The polycondensation can be conducted at a temperature in the range of from abou minus 20° C. to about 80° C. or higher, depending upon the boiling point of the solvent. Suitable acid acceptors include the tertiary amines, such as the trialkyl amines, e.g., triethylamine, or heterocyclic amines, e.g., pyridine.

The polyesteramides hereof can also be prepared by a known melt polycondensation technique whereby one mole of a diacetate of the aromatic amino phenol is reacted with 1.0 to 1.1 moles of the aromatic dicarboxyclic acid in the presence of a catalyst. The reaction mixture is heated in a stream of inert gas, e.g., nitrogen, to a reaction temperature between the melting temperature and the decomposition temperature of the monomers. The reaction pressure is reduced to below about 60 mm Hg for removal of acetic acid produced by the reaction. Further heating above the melting temperature of the polyesteramide product and reduction of the reaction pressure to below about 5 mm Hg results in additional removal of acetic acid by-product. Organometallic compounds such as titanium dioxide, antimony trioxide and butyl orthotitanate can be suitably employed as catalysts for the melt polycondensation reaction.

Polyesteramides of the present invention can also be prepared by ester interchange according to generally known procedures. Thus, one mole of a dialkyl ester of the aromatic dccarboxylic acid (or mixture) can be reacted with from about 1.1 to 2.5 moles of the aminophenol, generally at atmospheric pressure, although subatmospheric or superatmospheric conditions can be employed. Suitable catalysts for the ester interchange reaction, which is generally conducted over a range of from about 90° C. to about 325° C., include calcium acetate, sodium methoxide, antimony trioxide and tetraisoprpyl titanate. During the ester interchange reaction, an alcohol is removed as a by-product and heating is continued to effect the polycondensation.

The preparation of polyesteramides hereof can be illustrated by the following reaction scheme, involving the solution polycondensation of 2-trifluoromethyl-terephthaloyl chloride and 2-trifluoromethyl-4-aminophenol in dimethylacetamide (DMAc) and methylene chloride ($CH_2Cl_2$) solvent, using triethylamine as an acid acceptor:

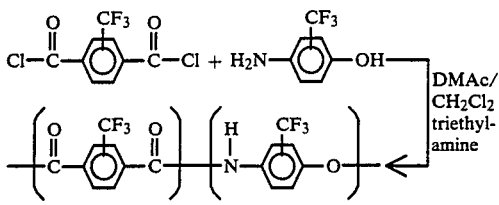

The 2-trifluoromethyl-4-aminophenol reactant shown in the above reaction scheme can be prepared in the manner reported by R. Filler, B. T. Khan and C. W. McMullen in J. Org. Chem., 27, 4660 (1962).

Inclusive of polyesteramides of the present invention are the polyesteramides represented by the following structures wherein indicated subscripts represent the molar amount of the respective repeating unit in the polyesteramide.

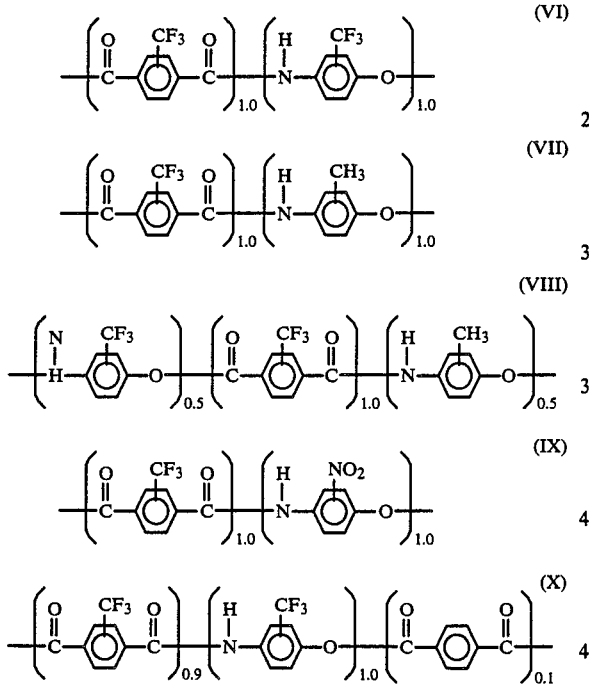

The polyesteramides of the present invention are especially advantageous from the standpoint of their melt processability which can be conducted at a temperature of about 260° C. or lower, and especially at a temperature of about 240° C. or lower. The melt processability of the polyesteramides of the invention allows for production of polymeric films and layers without the need for solvents or solvent handling and recovery.

The solubility of the polyesteramides in organic solvents also contributes importantly to the physical properties thereof. Solubility of the polyesteramide allows for the production of high polymers which are formed as the result of inadequate solubility and which show relatively poor physical properties.

The polyesteramides of the present invention can be variously formed or shaped into films, sheets, coatings, layers, fibrils, fibers or the like. Melt-casting, injection-molding and like forming and shaping techniques can be used for this purpose. Films and fibers or other shape forms of the polyesteramides can be redissolved and reshaped or refabricated if desired. Depending upon the nature of other repeating units as may be present in the polyesteramide materials, the melt-processing characteristics of the polymers hereof can be varied or controlled to suit particular applications.

If desired, a melt of the polyesteramide can be cast onto a suitable support material for the formation of a polymeric film or layer of the polyesteramide material. The polymeric film can be subjected to stretching so as to introduce molecular orientation and provide a film material having a birefringent character.

If desired the polyesteramides can be formed into fibers, fibrils or the like by melt extrusion methods known in the art. Thus, for example, a melt of the polyesteramide can be extruded into the form of fibers which can be cut, stretched or assembled into fiber tows or bundles as desired.

When a molecular orientation is permanently induced in the polyesteramide material, as by formation of the polyester into an oriented sheet, fiber or other form, the polyesteramide will exhibit optical birefringence which can be measured in accordance with a number of known methods. Known shaping or forming methods can be utilized to induce such orientation. Preferably, this will be accomplished by unidirectional stretching of a polymeric film, by extrusion of the polymer into a sheet, fiber or other stretched form, or by the combined effects of extrusion and stretching. In general, greater birefringence will be observed in the case of polymeric materials exhibiting a greater degree of molecular orientation.

The polyesteramides of the present invention can be utilized in the construction of a variety of optical filter or other devices. Optical devices in which the polyesteramides of the invention can be utilized, and their method for construction and modes of operation are described in detail in U.S. Pat. No. 4,446,305 of H. G. Rogers et al., issued May 1, 1984. Examples of other devices which can be adapted to include a polymeric and birefringent layer as described herein are described, for example, in U.S. Pat. No. 4,506,333 (issued Apr. 14, 1970 to E. H. Land); in U.S. Pat. No. 3,213,753 (issued Oct. 26, 1965 to H. G. Rogers); in U.S. Pat. No. 3,610,729 (issued Oct. 5, 1971 to H. G. Rogers); in U.S. Pat. No. 3,773,013 (issued Oct. 14, 1969 to H. G. Rogers); in U.S. Pat. No. 3,522,984 (issued Aug. 4, 1970 to H. G. Rogers); in U.S. Pat. No. 3,522,985 (issued Aug. 4, 1970 to H. G. Rogers); in U.S. Pat. No. 3,528,723 (issued Sept. 15, 1970 to H. G. Rogers); and in U.S. Pat. No. 3,582,424 (issued June 1, 1971 to K. Norvaisa).

The following non-limiting examples are illustrative of the present invention. All percentages are by weight except as otherwise indicated.

EXAMPLE 1

This example illustrates the polycondensation of 2-trifluoromethyl-4-aminophenol and 2-trifluoromethyl-terephthaloyl chloride.

A solution was prepared from 2.656 gm of 2-trifluoromethyl-4-aminophenol (0.015 mole, sublimed) in ten ml of dry dimethylacetamide, ten ml of methylene chloride and 4.5 ml of triethylamine. The solution was cooled in an ice/salt bath, under nitrogen, to 0° C. To the resultnng solution there was added dropwise via a syringe, while maintaining the reaction temperature between 0° to 5° C., a solution of 2-trifluoromethyl-terephthaloyl chloride (4.066 gm; 0.015 mole) in 15 ml methylene chloride. After stirring for three hours, the reaction mixture was allowed to elevate to room temperature. To the reaction mixture were added 25 ml of dimethylacetamide to provide a clear, viscous solution which was then precipitated in methanol. A white, fibrous polymer was collected by filtration and was washed with methanol and dried under vacuum. The polymer (5.91 gm; 95%) was a polymer having the structure represented by formula (VI). Inherent viscosity (measured in dimethylacetamide, at 30° C. and a concentration of 0.5 gm per dl) was 0.76 dl per gram.

The melting temperature of the polymer (in the range of 230° to 235° C.) was determined by hot-stage microscopy using a heated sample positioned between crossed polarizers. The range of temperatures over which the heated sample exhibited melt anisotropy was observed and recorded.

EXAMPLE 2

Using a polycondensation method, substantially as described in EXAMPLE 1, a polyesteramide having the repeating units as represented by formula (VII) was prepared. Inherent viscosity and melting temperature range were determined using the techniques described in EXAMPLE 1. The polymer exhibited an inherent viscosity of 0.44 dl per gram. A melting range of 250°–255° C. was recorded.

CONTROL EXAMPLE

For purposes of comparison with the melting temperatures of the polyesteramides of EXAMPLES 1 and 2, a polyesteramide having the following repeating units was prepared:

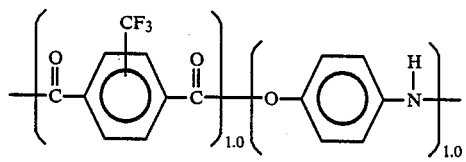

(C-1)

The polyesteramide of formula (C-1) showed an intrinsic viscosity of 1.04 dl/g. Melting point determination showed the polymer simultaneously melted and decomposed at 358° C.

Inspection of the data recorded for the polyesteramides of Examples 1 and 2 show that, in general, the polyesteramides of the invention are characterized by high molecular weight and that melting temperature ranges suited to melt processability are reported.

What is claimed is:

1. A melt-processable polyesteramide capable of forming an anisotropic melt phase at a temperature of approximately 260° C. or lower, comprising as essential units, repeating units (I) and (II) wherein:

(I) is a repeating unit of the formula

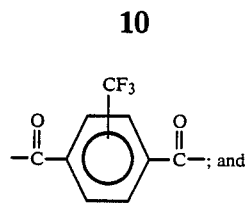

(II) is a repeating unit of the formula

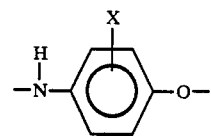

wherein X is alkyl, alkoxy, trifluoromethyl, halogen or nitro.

2. The melt-processable polyesteramide of claim 1 wherein, in said repeating unit of formula (II), X is alkyl.

3. The melt-processable polyesteramide of claim 2 wherein said alkyl is methyl.

4. The melt-processable polyesteramide of claim 1 wherein, in said repeating unit of formula (II), X is trifluoromethyl.

5. The melt-processable polyesteramide of claim 1 capable of forming an anisotropic melt phase at a temperature of approximately 240° C. or lower.

6. A melt-processable polyesteramide capable of forming anaanisotropic melt phase at a temperature of approximately 260° C. or lower, consisting essentially of repeating units (I) and (II) wherein:

(I) is a repeating unit of the formula

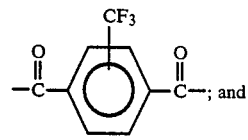

(II) is a repeating unit of the formula

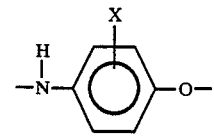

wherein X is alkyl, alkoxy, trifluoromethyl, halogen or nitro.

7. The melt-processable polyesteramide of claim 6 capable of forming an anisotropic melt at a temperature of approximately 240° C. or lower.

8. The melt-processable polyesteramide of claim 6 wherein, in said repeating unit of formula (II), X is alkyl.

9. The melt-processable polyesteramide of claim 6 wherein said alkyl is methyl.

10. The melt-processable polyesteramide of claim 6 wherein, in said repeating unit of formula (II), X is trifluoromethyl.

11. The melt-processable polyesteramide of claim 6 wherein, in said repeating unit of formula (II), X is alkoxy.

* * * * *